(12) United States Patent
Cern

(10) Patent No.: US 7,378,944 B2
(45) Date of Patent: May 27, 2008

(54) CONTROLLING POWER OUTPUT OF A MODEM FOR POWER LINE COMMUNICATIONS

(75) Inventor: Yehuda Cern, Brookline, MA (US)

(73) Assignee: Ambient Corporation, Newton, MA (US)

(*) Notice: Subject to any disclaimer, the term of this patent is extended or adjusted under 35 U.S.C. 154(b) by 799 days.

(21) Appl. No.: 10/702,572

(22) Filed: Nov. 6, 2003

(65) Prior Publication Data

US 2004/0109499 A1    Jun. 10, 2004

Related U.S. Application Data

(60) Provisional application No. 60/424,064, filed on Nov. 6, 2002.

(51) Int. Cl.
G05B 11/01    (2006.01)
H04B 7/02    (2006.01)

(52) U.S. Cl. .............. 340/310.11; 340/310.12; 340/310.15; 340/310.17; 375/267

(58) Field of Classification Search ........... 340/310.01, 340/310.05, 310.07, 506, 532; 375/267, 375/295, 200; 324/601; 455/63
See application file for complete search history.

(56) References Cited

U.S. PATENT DOCUMENTS

| 4,371,867 | A | * | 2/1983 | Gander | 307/3 |
|---|---|---|---|---|---|
| 4,543,540 | A | * | 9/1985 | Linder | 331/1 A |
| 4,556,866 | A | * | 12/1985 | Gorecki | 375/272 |
| 4,563,650 | A | * | 1/1986 | York et al. | 329/306 |
| 4,583,090 | A | | 4/1986 | Eden et al. | |
| 4,641,322 | A | * | 2/1987 | Hasegawa | 375/145 |
| 4,729,125 | A | | 3/1988 | Sterling, Jr. et al. | |
| 4,745,392 | A | * | 5/1988 | Ise et al. | 375/285 |
| 4,845,466 | A | | 7/1989 | Hariton et al. | |
| 5,491,463 | A | * | 2/1996 | Sargeant et al. | 340/310.16 |
| 5,589,813 | A | * | 12/1996 | Nielsen | 375/257 |
| 5,717,685 | A | * | 2/1998 | Abraham | 370/276 |
| 5,828,293 | A | * | 10/1998 | Rickard | 375/257 |
| 5,886,619 | A | | 3/1999 | Takasan et al. | |
| 5,929,748 | A | | 7/1999 | Odinak | |
| 5,982,276 | A | * | 11/1999 | Stewart | 455/402 |
| 5,991,269 | A | | 11/1999 | Williamson et al. | |
| 6,229,432 | B1 | * | 5/2001 | Fridley et al. | 340/310.14 |
| 6,320,494 | B1 | | 11/2001 | Bartels et al. | |
| 6,417,762 | B1 | * | 7/2002 | Comer | 375/260 |
| 6,515,485 | B1 | * | 2/2003 | Bullock et al. | 324/601 |

OTHER PUBLICATIONS

Supplementary European Search Report Application No. 03783182, dated Oct. 12, 2006.

* cited by examiner

*Primary Examiner*—Brian Zimmerman
*Assistant Examiner*—Nam Nguyen
(74) *Attorney, Agent, or Firm*—Ohlandt, Greeley, Ruggiero & Perle, LLP

(57) ABSTRACT

There is provided an arrangement of components for use in a power line communication system. The arrangement includes a modem for providing an output to a power line, a sensor for sensing a parameter of the output; and a controller for adjusting a power of the output based on a value of the parameter.

18 Claims, 6 Drawing Sheets

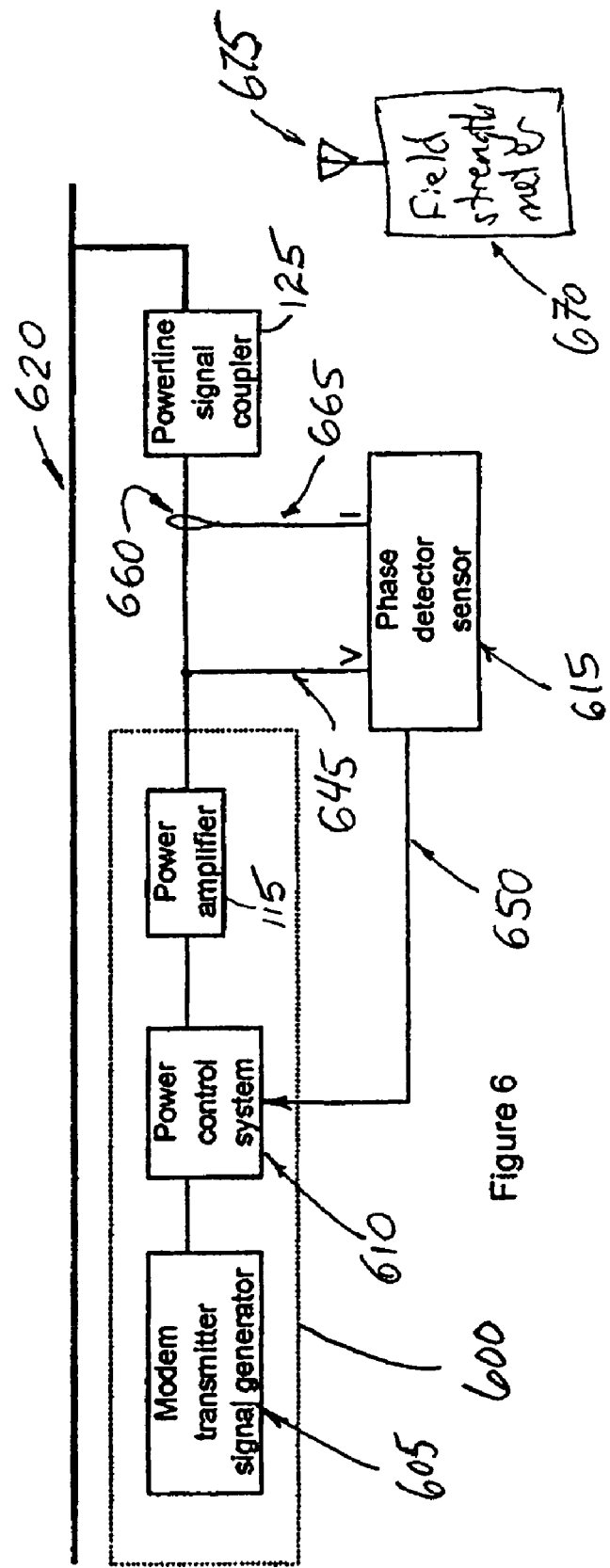

CONTROLLING POWER OUTPUT OF A MODEM FOR POWER LINE COMMUNICATIONS

CROSS-REFERENCE TO RELATED APPLICATIONS

The present application is claiming priority of U.S. Provisional Patent Application Ser. No. 60/424,064, filed on Nov. 6, 2002, the content of which is herein incorporated by reference.

BACKGROUND OF THE INVENTION

1. Field of the Invention

The present invention relates to power line communications (PLC), and more particularly, to a configuration of a modem having an optimized output power level over its operating frequency spectrum.

2. Description of the Related Art

In a power line communication (PLC) system, output power of a transmitter in a wideband power line modem is coupled to a power line. The power line has an impedance magnitude characteristic and a phase characteristic that vary widely across a frequency band of the transmitter. The transmitter can be modeled as a Thevenin equivalent circuit having a fixed voltage source and a mainly resistive source impedance. As a result of an impedance mismatch between source and load, signal power coupled to the power line varies widely over the transmitter frequency band.

When the signal power level is limited to a highest level compliant with regulatory limits, the limit is set for a frequency where power coupling and power line radiation efficiency are most efficient. This frequency is referred to herein as $f_{max-rad}$.

FIG. 1 is a block diagram of a prior art modem arrangement with a flat transmitter spectrum. A modem 100 is attached to a power line 120 via a signal coupler 125. A functional internal structure of modem 100 is represented by a modem transmitter signal generator 105, a power control system 110, and a power amplifier 115. Signal generator 105 and power control system 110 may be physically embodied in the same module of hardware and software, but are illustrated here separately for clarity.

Graph 150 shows a simplified variation of electromagnetic radiation intensity for modem 100. Modem power 155 is constant across a frequency band and is limited to $P_{max1}$ 160 to prevent radiation intensity 162 from exceeding radiation limit 165 at frequency $f_{max-rad}$ 170. However, at other frequencies, the coupled power will be lower than that allowed by regulatory limits, and thus, performance of modem 100 is less than optimal.

SUMMARY OF THE INVENTION

An embodiment of the present invention is an arrangement of components for use in a power line communication system. The arrangement includes a modem for providing an output to a power line, a sensor for sensing a parameter of the output, and a controller for adjusting a power of the output based on a value of the parameter.

Another embodiment of the present invention is a method employed in a power line communication system. The method includes providing an output from a modem to a power line, sensing a parameter of the output, and adjusting a power of the output based on a value of the parameter.

BRIEF DESCRIPTION OF THE DRAWINGS

FIG. 6 is a block diagram of a modem arrangement using modem transmitter spectral control based on sensing real power out of a modem transmitter.

DESCRIPTION OF THE INVENTION

Many wideband modems have a mechanism, termed a power mask, to set a separate signal power level for each of several frequency sub-bands. The power mask is often realized as part of a digital processing operation involved in generating a signal from the modem. In an embodiment of the present invention, the power mask is used to reduce the power at $f_{max-rad}$ and raise the power at other frequencies. This improves communications performance while ensuring compliance to radiation limits.

Ideally, an electromagnetic field sensor is used as an input to an automatic mechanism for optimizing the power mask. Alternatively, a voltage or current sensor may be used to sense the power level on the power line. While this technique of optimizing the power mask to compensate for variations in sensed signal voltage or current ignores radiation efficiency variation of the power line over frequency, a system operator can perform radiation measurements and determine a maximum power level that is compliant with radiation limits.

For medium or high voltage lines, voltage or current sensors may be very expensive. An alternative to the use of voltage or current sensors is to build a sensor into the modem, where the sensor senses a real component of modem output power. The power mask then adjusts the real component of the output power to be as uniform as possible over the modem's transmitter frequency band.

A further improvement measures or calculates coupling efficiency of the power line coupler, when the coupler is connected to a power line, and compensates for a variation of coupling efficiency over the frequency band. The coupling efficiency may be expressed as a ratio of power coupled to the power line divided by the real component of the modem's output power.

Figure 1:
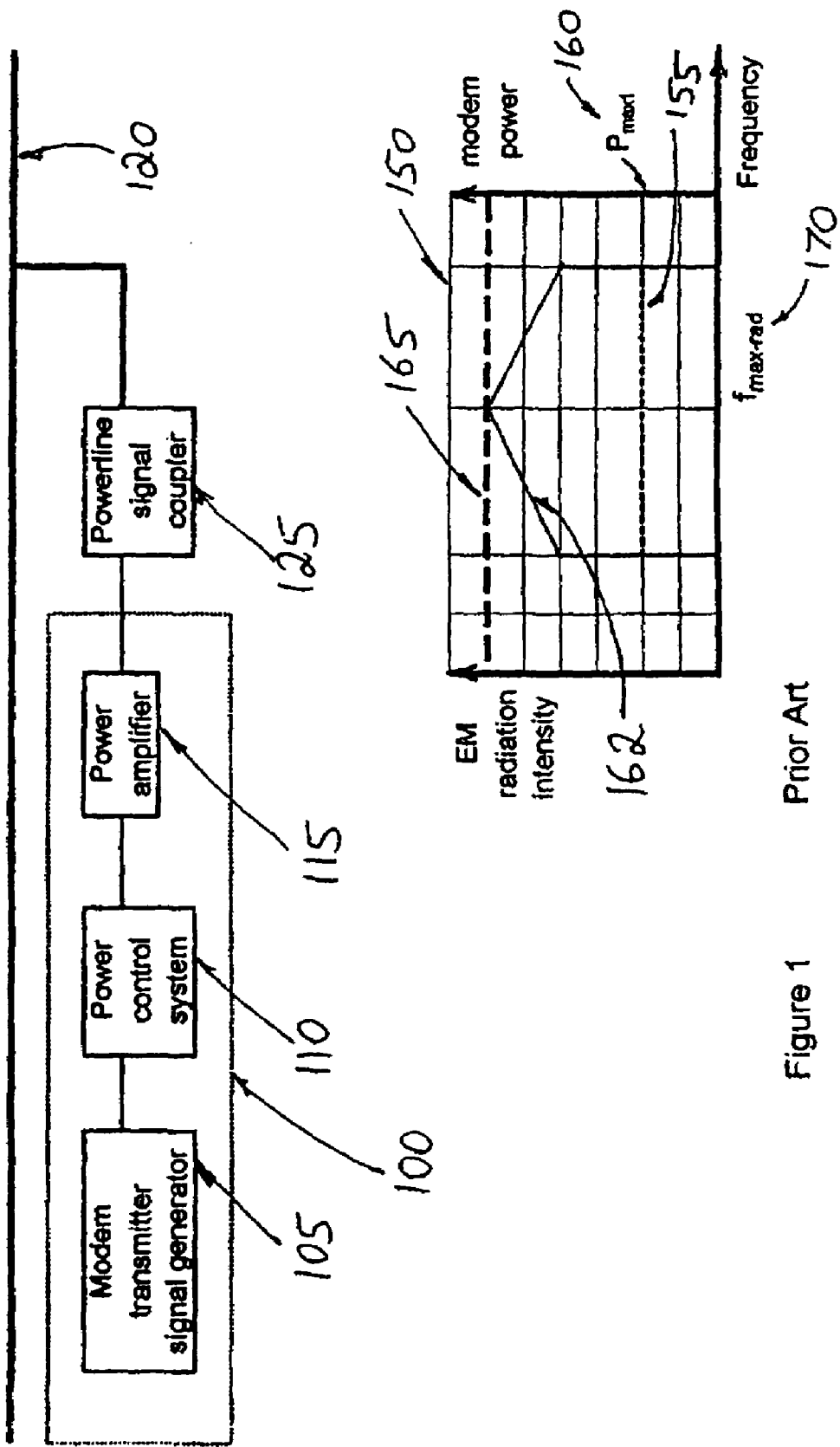
FIG. 1 is a block diagram of a prior art modem arrangement with a flat transmitter spectrum.
Figure 2:
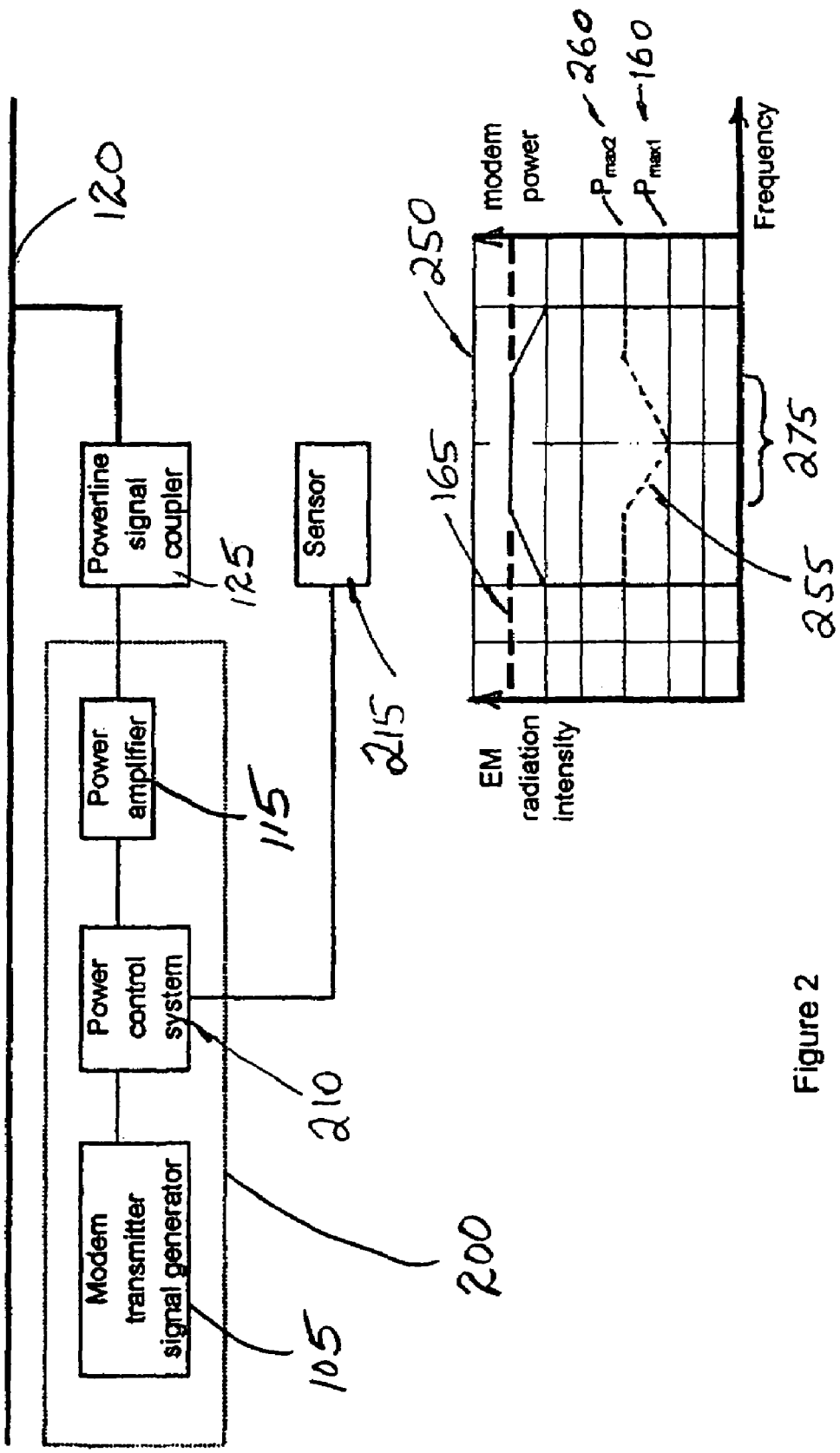
FIG. 2 is a block diagram of a modem arrangement using a sensor to feed back information to a power control system, in accordance with the present invention.

FIG. 2 is a block diagram of a modem arrangement using a sensor to feed back information to a power control system, in accordance with the present invention. The arrangement in FIG. 2 includes a modem 200 and a sensor 215.

Modem 200 provides an output to power line 120 via coupler 125. Modem 200 includes a modem transmitter signal generator 105, a power amplifier 115 and a power control system 210.

Sensor 215 detects electromagnetic radiation intensity output by modem 200 and outputs a signal that is proportional to the electromagnetic radiation intensity. The signal is provided from sensor 215 to power control system 210 to modify a signal spectrum from modem 200 in order to provide an optimized spectrum. The optimized spectrum provides maximum output power from modem 200 to power line 120 consistent with avoidance of non-compliance with maximum allowed electromagnetic radiation intensity. Thus, power control system 210 maximizes modem power 255 while limiting modem power 255 to a predetermined level of electromagnetic radiation.

Assume that the output of modem 200 includes a first frequency sub-band and a second frequency sub-band. Modem 200 sequentially transmits over the first frequency sub-band and the second frequency sub-band, and power control system 210 adjusts the power for the first frequency sub-band and the power for the second frequency sub-band.

Graph 250 shows modem power 255, increased from level $P_{max1}$ 160 to a maximum level $P_{max2}$ 260 modified by a power mask 255. Modem power 255 has reduced power levels over a most radiative frequency span 275 so as to not exceed radiation limit 165.

Figure 3:
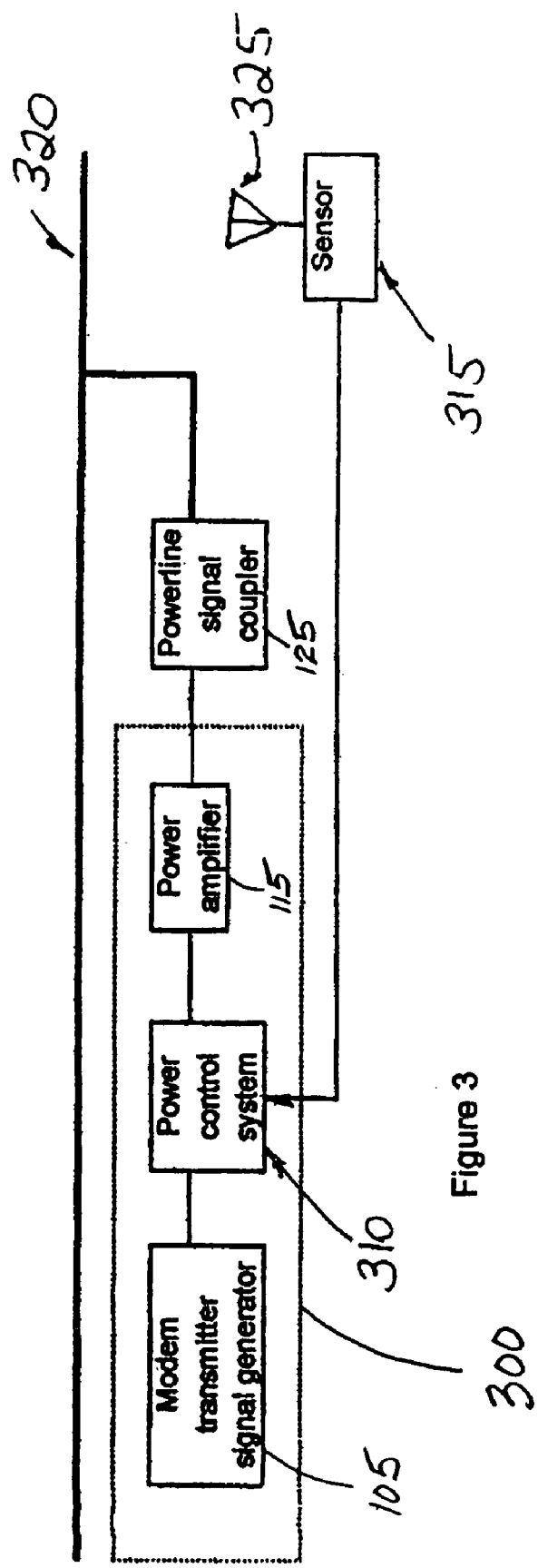
FIG. 3 is a block diagram of a modem arrangement using modem transmitter spectral control based on sensing electromagnetic radiation.

FIG. 3 is a block diagram of a modem arrangement using modem transmitter spectral control based on sensing electromagnetic radiation. A modem 300 provides an output to a power line 320. A sensor 315 senses radiation field strength of the output of modem 300 via an antenna 325. An output of sensor 315, which is proportional to the radiation field strength, is fed back to a power control system 310 in modem 300.

Figure 4:
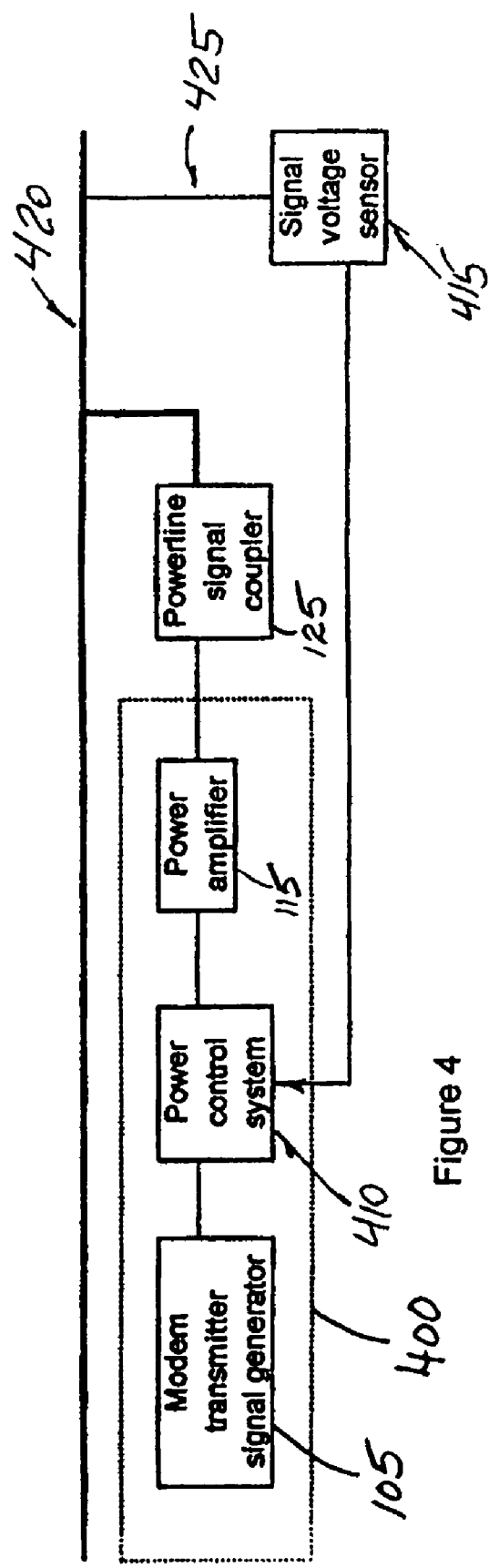
FIG. 4 is a block diagram of a modem arrangement using modem transmitter spectral control based on sensing signal voltage on a power line.

FIG. 4 is a block diagram of a modem arrangement using modem transmitter spectral control based on sensing signal voltage on a power line. A modem 400 provides an output to a power line 420. A voltage sensor 415 senses a voltage level of the output of modem 400 on power line 420 via a wire 425. An output of sensor 415, which is proportional to the voltage level, is fed back to a power control system 410 in modem 400.

Figure 5:
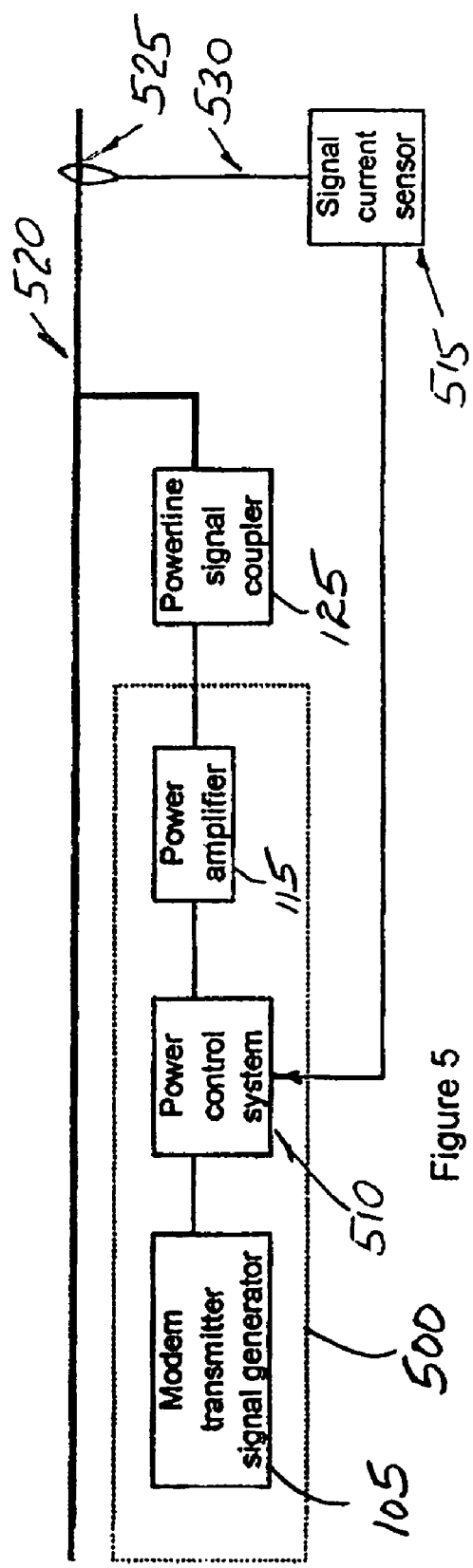
FIG. 5 is a block diagram of a modem arrangement using modem transmitter spectral control based on sensing signal current on a power line.

FIG. 5 is a block diagram of a modem arrangement using modem transmitter spectral control based on sensing signal current on a power line. A modem 500 provides an output to a power line 520. A signal current sensor 515 senses a signal current level of the output of modem 500 on power line 520 via sensing transducer 525 and a cable 530. An output of sensor 515, which is proportional to the signal current level, is fed back to a power control system 510 in modem 500.

FIG. 6 is a block diagram of a modem arrangement using modem transmitter spectral control based on sensing real power out of a modem transmitter. FIG. 6 illustrates a system that can be built entirely within a modem. A modem 600 provides an output to a power line 620. A phase detector 615 senses voltage through a connection 645 and senses current through a current-voltage transducer 660 and a cable 665. An output 650 of phase detector 615, which is proportional to the product of the voltage and the component of current that is in phase with the voltage, which is proportional to the real power supplied by the modem, is fed back to a power control system 610 in modem 600.

FIG. 6 also illustrates an additional optional improvement. A power meter 670 detects and indicates a power level of the electromagnetic field radiated by power line 620 and originating from a signal from modem 600, at a location near power line 620 via an antenna 675. Modem 600 includes a modem signal generator 605 that is programmable to sweep through transmitter sub-bands. An installing technician or automated system calculates a radiation efficiency curve for each sub-band. The curve is calculated as a ratio of (a) field strength of the electromagnetic field as indicated by power meter 670, and (b) power as indicated at output 650. The inverse of the curve is programmed by the installing technician or automated system into the power control system 610 to compensate for factors outside of a control loop of modem 600. This control loop includes modem 600, phase detector 615 and connection 645 and current-voltage transducer 660. Power control system 610 adjusts power out of modem 600 to compensate for variations in the ratio over a transmitter frequency band of modem 600. Such factors vary over the frequency band and include power line signal coupler efficiency and power line radiation efficiency.

It should be understood that various alternatives and modifications of the present invention could be devised by those skilled in the art. Nevertheless, the present invention is intended to embrace all such alternatives, modifications and variances that fall within the scope of the appended claims.

What is claimed is:

1. A system comprising:
   a modem for providing an output to a power line in a power line communication system;
   a sensor for sensing a parameter of said output; and
   a controller for adjusting a power of said output based on a value of said parameter,
   wherein said output includes a first frequency sub-band and a second frequency sub-band, and
   wherein said controller adjusts said power to a first power for said first frequency sub-band and a second power for said second frequency sub-band.

2. The system of claim 1, wherein said controller maximizes said power while limiting said power to a predetermined level of electromagnetic radiation.

3. The system of claim 1, wherein said parameter comprises an electromagnetic radiation.

4. The system of claim 1, wherein said parameter comprises a signal current in said power line.

5. The system of claim 1, wherein said parameter comprises a signal voltage on said power line.

6. The system of claim 1, wherein said parameter comprises a real component of said power.

7. The system of claim 6, wherein said sensor comprises a phase detector that receives an input indicative of said real component.

8. The system of claim 1,
   wherein said output produces an electromagnetic radiation intensity from said power line,
   wherein said parameter and said electromagnetic radiation form a ratio, and
   wherein said controller adjusts said power to compensate for variations in said ratio over a transmitter frequency band of said modem.

9. A system comprising:
   a modem for providing an output to a power line in a power line communication system;
   a sensor for sensing a parameter of said output; and
   a controller for adjusting a power of said output based on a value of said parameter,
   wherein said modem provides said output by sequentially transmitting over a first frequency sub-band and a second frequency sub-band, and
   wherein said controller adjusts said power to a first power for said first frequency sub-band and a second power for said second frequency sub-band.

10. A method comprising:
    providing an output from a modem to a power line in a power line communication system;
    sensing a parameter of said output; and
    adjusting a power of said output based on a value of said parameter, wherein said output includes a first frequency sub-band and a second frequency sub-band, and wherein said adjusting comprises adjusting said power to a first power for said first frequency sub-band and a second power for said second frequency sub-band.

11. The method of claim 10, wherein said adjusting comprises maximizing said power while limiting said power to a predetermined level of electromagnetic radiation.

12. The method of claim 10, wherein said parameter comprises an electromagnetic radiation.

13. The method of claim 10, wherein said parameter comprises a signal current in said power line.

14. The method of claim 10, wherein said parameter comprises a signal voltage on said power line.

15. The method of claim 10, wherein said parameter comprises a real component of said power.

16. The method of claim 15, wherein said sensing is performed by a phase detector that receives an input indicative of said real component.

17. The method of claim 10, wherein said output produces an electromagnetic radiation intensity from said power line, wherein said parameter and said electromagnetic radiation form a ratio, and wherein said adjusting comprises adjusting said power to compensate for variations in said ratio over a transmitter frequency band of said modem.

18. A method comprising:

providing an output from a modem to a power line in a power line communication system;

sensing a parameter of said output; and adjusting a power of said output based on a value of said parameter, wherein said modem provides said output by sequentially transmitting over a first frequency sub-band and a second frequency sub-band, and wherein said adjusting comprises adjusting said power to a first power for said first frequency sub-band and a second power for said second frequency sub-band.

* * * * *